(12) United States Patent
Hiraku et al.

(10) Patent No.: US 6,834,627 B2
(45) Date of Patent: Dec. 28, 2004

(54) INTAKE AIR AMOUNT CONTROL APPARATUS AND METHOD OF INTERNAL COMBUSTION ENGINE

(75) Inventors: Keizo Hiraku, Nishikamo-gun (JP); Naohide Fuwa, Toyota (JP); Hirohiko Yamada, Okazaki (JP); Takahiro Yamanashi, Susono (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 10/797,187

(22) Filed: Mar. 11, 2004

(65) Prior Publication Data

US 2004/0187815 A1 Sep. 30, 2004

(30) Foreign Application Priority Data

Mar. 27, 2003 (JP) ...................................... 2003-088073

(51) Int. Cl.[7] .................................................. F01L 1/34
(52) U.S. Cl. ..................................... 123/90.15; 123/391
(58) Field of Search ........................... 123/90.15, 90.16, 123/90.17, 90.18, 345, 346, 347, 348, 391, 398, 403

(56) References Cited

U.S. PATENT DOCUMENTS 6,318,313 B1    11/2001   Moriya et al.
6,408,806 B2 *   6/2002   Sugiyama et al. ....... 123/90.15
6,425,357 B2     7/2002   Shimizu et al.
6,491,022 B2 * 12/2002   Okamoto .................... 123/396
6,732,707 B2 *   5/2004   Kidokoro et al. ........... 123/396

FOREIGN PATENT DOCUMENTS

| JP | A 10-184406 | 7/1998 |
| JP | A 2000-73799 | 3/2000 |
| JP | A 2001-65374 | 3/2001 |
| JP | A 2001-65376 | 3/2001 |
| JP | A 2001-200737 | 7/2001 |
| JP | A 2001-263015 | 9/2001 |

* cited by examiner

Primary Examiner—Thomas Denion
Assistant Examiner—Ching Chang
(74) Attorney, Agent, or Firm—Oliff & Berridge, PLC (57) ABSTRACT

An intake air amount control apparatus for an internal combustion engine is provided with: an opening control mechanism and a variable valve mechanism, which control an intake air amount; an intake characteristics change mechanism for controlling the intake air amount by adjusting a parameter or parameters different from those of the above two mechanisms; and an intake amount control device for performing a cooperative control of these mechanisms upon the occurrence of any normal condition. The intake air amount control apparatus is also provided with: an abnormality detection device for detecting an abnormal condition in these three mechanisms; and a fail-safe device for controlling the intake air amount of the opening control mechanism out of these three mechanisms and controlling the other two mechanism, so as to fix their control amounts to constant values.

18 Claims, 4 Drawing Sheets

INTAKE AIR AMOUNT CONTROL APPARATUS AND METHOD OF INTERNAL COMBUSTION ENGINE

BACKGROUND OF THE INVENTION

1. Field of the Invention

The present invention relates to an internal combustion engine mounted on a vehicle or the like, and more specifically to an intake air amount control apparatus for the internal combustion engine for and an intake air amount control method thereof of performing fail-safe processing for the internal combustion engine which controls an intake air amount or an intake amount, by using an air-system variable mechanism provided with: a variable valve mechanism; an opening control mechanism of a throttle valve; and an intake characteristics change mechanism, such as a variable intake system (or "Acoustic Control Induction System (ACIS))" and a swirl control valve system (i.e. an intake airflow control mechanism), for example.

2. Description of the Related Art

In order to control the intake air amount or the intake amount, as for the internal combustion engine mounted on a vehicle or the a like, development has been recently proceeding with an internal combustion engine which employs a complicated air-system variable mechanism provided with: an electronic control or computerized throttle-valve mechanism for driving the opening and closing of a throttle valve by an actuator; a variable valve mechanism capable of varying at least one of three constituent elements of the opening/closing characteristics (or valve opening characteristics) of an intake valve or an exhaust valve (i.e. an opening and closing timing, an operating angle, and a lift amount); and an intake characteristics change mechanism, such as a variable intake system and a swirl control valve system (i.e. an intake airflow control mechanism), for example. Specifically, in order to obtain the desired or targeted torque corresponding to the accelerator opening operated by a driver, the control is performed so as to intake the desired or targeted intake air amount by cooperatively controlling the actuators of the various air-system variable mechanisms.

As an operating angle change mechanism, which is one of the above-described opening/closing characteristics, it is possible to exemplify a mechanism for continuously changing the operating angle of the intake valve and the lift amount by using a rotating cam, as described in Japanese Patent Application Laying Open NO. 2001-263015, for example.

Moreover, as described in Japanese Patent Application Laying Open NO. 2001-65376, for example, such a technique is also known that the opening and closing timing of the intake valve out of the constituent elements of the opening/closing characteristics is fixed to the most retarded or delayed time when an opening measurement sensor (e.g. a throttle position sensor) in the opening control mechanism of a throttle valve has a failure.

Moreover, as described in Japanese Patent Application Laying Open NO. Hei 10-184406, for example, such a technique is also known that the operating angle out of the opening/closing characteristics of the intake valve is fixed to the largest side in the internal combustion engine for controlling the intake air amount by adjusting the opening/closing characteristics of the intake valve and by the opening control mechanism of a throttle valve (e.g. an electronic control throttle valve), as the fail-safe processing upon the failure or malfunction of the opening control mechanism of a throttle valve.

Furthermore, as described in Japanese Patent Application Laying Open NO. 2001-65374, for example, such a technique is also known that the opening and closing timing of the intake valve is set to the most retarded or delayed time when a water thermometer has a failure.

However, if at least one of the above-described various air-system variable mechanisms has a failure, a situation may turn out to be what is usually not assumed as the control of the intake air amount in some cases. In this case, because the cooperative control among the opening control mechanism, the intake-air-characteristics change mechanism, and the variable valve mechanism diverges (i.e. the three mechanisms are no longer cooperatively controlled), the operating condition of the internal combustion engine possibly may become worse and an evacuation run may become impossible, which is technically a problem.

SUMMARY OF THE INVENTION

It is therefore an object of the present invention to provide an intake air amount control apparatus and an intake air amount control method for an internal combustion engine which can appropriately continue the operation thereof even in case that at least one of the three mechanisms has a failure or abnormality, for the internal combustion engine, in which the intake air amount is controlled by cooperatively controlling (i) the opening control mechanism of a throttle valve or the like, (ii) the intake characteristics change mechanism, such as the variable intake system and the swirl control valve system and (iii) the valuable valve mechanism, such as the operating angle change mechanism and a timing change mechanism (or Variable Valve Timing (VVT)).

The main purpose of the present invention is to prohibit the cooperative control to thereby prevent the divergence of the control and to preferably control the intake air amount of the internal combustion engine by one normal mechanism of (I) the opening control mechanism, (II) the variable valve mechanism and (III) the intake characteristics change mechanism, in case that there is an abnormality in any one of the three mechanisms in a technique of controlling the intake air amount of the internal combustion engine by the cooperative control of the three mechanisms.

The above object of the present invention can be achieved by a first intake air amount control apparatus for an internal combustion engine provided with: an opening control mechanism for controlling an opening of a throttle valve disposed on an intake path of the internal combustion engine; a variable valve mechanism for varying opening/closing characteristics (which mean both of the opening characteristic and the closing characteristics, or may mean one of the opening characteristic and the closing characteristic) of at least one of an intake valve and an exhaust valve of the internal combustion engine; an intake characteristics change mechanism for changing the intake characteristics of the internal combustion engine by controlling a parameter or parameters different from (i) the opening of the throttle valve and (ii) the opening/closing characteristics of the at least one of the intake valve and the exhaust valve; an intake amount control device for controlling an intake air amount supplied into a combustion chamber of the internal combustion engine by performing a cooperative control of the opening control mechanism, the variable valve mechanism and the intake characteristics change mechanism; an abnormality detection device for detecting an abnormal condition in the opening control mechanism and the variable valve mechanism; and a fail-safe device for controlling the opening control mechanism, the variable valve mechanism, and the intake characteristics change mechanism, in case that the abnormal condition is detected by the abnormality detection device in one of the opening control mechanism and the variable valve mechanism, so as to control the intake air amount by the other of the opening control mechanism and the variable valve mechanism, in place of the cooperative control by the intake amount control device.

According to the first intake air amount control apparatus for the internal combustion engine of the present invention, upon the operation thereof, the intake air amount supplied into the combustion chamber is controlled by that the three mechanisms, which are (I) the opening control mechanism of a throttle valve; (II) the variable valve mechanism; and (III) the intake characteristics change mechanism, are cooperatively controlled by the intake amount control device. More specifically, for example, while the intake air amount accompanying changes in the opening of the throttle valve according to the accelerator opening is measured by an intake amount measurement apparatus, the opening of the throttle valve is controlled by the opening control mechanism. At the same time of this, the opening/closing characteristics of at least one of the intake valve and the exhaust valve is controlled by the variable valve mechanism. The "opening/closing characteristics" associated with the present invention is the opening and closing timing of at least one of the intake valve and the exhaust valve, the lift amount, or a lift period (i.e. the operating angle). Moreover, at the same time of these, a predetermined parameter associated with the intake characteristics are controlled by the intake characteristics change mechanism, such as a swirl control valve, a variable intake system control valve, and the timing change mechanism, for example. The "intake characteristics" associated with the present invention is: the adjustment amount of the opening of the swirl control valve as described later; the adjustment amount of the length of an effective intake tube, the capacity of a serge tank, the capacity and the cross sectional area of an intake port or an intake tube, or the like, which are the variable intake system control valve; and the adjustment amount of a phase angle for changing the opening and closing timing of the intake valve or the exhaust valve. For example, a desired or target intake air amount is determined by the intake amount control device according to the parameter for indicating the operating condition, such as a required (or desired) torque according to the number of engine revolutions and the accelerator opening operated by a driver (or an operator). In order to obtain this intended desired intake air amount, various control amounts associated with the opening/closing characteristics or the like which are desired are determined on the basis of a preset parameter table or a preset predetermined function, for example. The actuators of the three air-system variable mechanisms are cooperatively controlled by the intake amount control device so as to correspond to the desired various control amounts. Under such a cooperative control, the internal combustion engine is operated.

For example, when there is an abnormal condition in the opening control mechanism of the throttle valve, the abnormality is detected by the abnormality detection device. The abnormality which is detected specifically means, for example, the condition that the difference between the actual opening of the opening control mechanism of the throttle valve and the opening of the opening control mechanism of the throttle valve indicated by the intake amount control device is larger than a predetermined threshold value. Alternatively, when there is an abnormal condition in the variable valve mechanism, the abnormality is detected by the abnormality detection device. The abnormality which is detected specifically is, for example, an open-side failure (i.e. such a failure that the intake valve deviates to an open side to operate as compared with the normal case for some causes or that it is fixed to the open side) or an close-side failure (i.e. such a failure that the intake valve deviates to a close side to operate as compared with the normal case for some causes or that it is fixed to the close side).

When such an abnormality is detected by the abnormality detection device in one of (I) the opening control mechanism of the throttle valve and (II) the variable valve mechanism, the intake air amount is controlled by the other of the opening control mechanism and the variable valve mechanism, in which the abnormality is not detected, i.e. by the normal opening control mechanism or the normal variable valve mechanism, under the control of the fail-safe device, in place of the cooperative control by the intake amount control device for the above-described three mechanisms. In this manner, in the present invention, the three mechanisms are controlled under the control of the "fail-safe device" upon the occurrence of any abnormal condition while the three mechanisms are controlled under the control of the "intake amount control device" in the normal condition. The "fail-safe device" and the "intake amount control device" may comprise the same controller (e.g. an ECU described later) or the same control device which can perform both of the control upon the occurrence of any abnormal condition and the control in the normal condition. Alternatively, they may comprise different exclusive controllers or different control devices which can separately perform the control upon the occurrence of any abnormal condition and the control in normal condition.

As a result, for example, the fuel injection is performed in each cylinder according to the intake air amount controlled by the normal variable valve mechanism and the number of engine revolutions. Alternatively, for example, the fuel injection is performed in each cylinder according to the intake air amount controlled by the normal opening control mechanisms of the throttle valve and the number of engine revolutions.

One specific example of the intake characteristics change mechanism of the present invention, that is, the "variable intake system (or ACIS)" is a mechanism whose purpose is to obtain the high volume efficiency in the broad range of engine revolutions by varying the length and the cross sectional area of the effective intake tube. Specifically, in a low-speed operation, the variable intake system makes the length of the effective intake tube relatively long and the cross section area thereof relatively small in order to increase the volume efficiency at low revolutions, by using a resonance supercharged effect. On the other hand, in a high-speed operation, the variable intake system is realized by making the length of the effective intake tube relatively short and the cross section area thereof relatively large in order to increase the volume efficiency at high revolutions, by using the inertia supercharged effect. Moreover, a mechanisms of varying the capacity of a serge tank is also conceivable as a specific example as it carries the same function.

Another specific example of the intake characteristics change mechanism of the present invention, that is, the "Swirl Control Valve System (SCV)" is a mechanism which makes the intake port function as a swirl port which generates a lateral excess flow to mix fuel and the air sufficiently or which uses the intake port as a typical port by varying the direction of a valve disposed in the intake port, thereby to realize both the increase of the output and the improvement of the fuel consumption. Moreover, a "Tumble Control Valve System (TCV)" which functions as a tumble port for generating a longitudinal excess flow is also conceivable as a specific example as it carries the same function.

Moreover, another specific example of the intake characteristics change mechanism of the present invention, that is, the "timing change mechanism (or VVT)" of the intake valve and/or the exhaust valve is a mechanism which changes the opening and closing timing of the intake valve and the exhaust valve thereby to realize the efficient intake and/or the exhaust according to the number of engine revolutions and the desired torque, and by which the intake air amount can be controlled. In the present invention, such a timing change mechanism (or VVT) can be treated as the specific example of the "intake characteristics change mechanism". It can also be treated as a part or all of the "variable valve mechanism" for varying the operating angles of the intake valve and the exhaust valve or the lift amount associated with the present invention.

Consequently, even if one of the opening control mechanism of the throttle valve and the variable valve mechanism, which constitute the air-system variable mechanism, has a failure, the intake air amount is controlled by the other of the opening control mechanism and the variable valve mechanism, in which the abnormality is not detected, i.e. by the normal opening control mechanism or the normal variable valve mechanism, under the control of the fail-safe device. Namely, the evacuation run sufficiently becomes possible by performing the simple intake-air-amount control by the mechanism in which there is not any abnormality. In other words, the evacuation run sufficiently becomes possible even upon the occurrence of an abnormal condition, while the present invention adopts such a structure that the internal combustion engine is operated under the cooperative control of actuators in various air-system variable mechanisms, which is suitable for the high fuel consumption and/or the high efficiency in the normal condition, so that the present invention is extremely useful in practice.

In particular, when there is an abnormality in one of the three mechanisms, the control for the evacuation run is performed not by the other two normal mechanisms but by the other one normal mechanism (i.e., by the just one normal mechanism). Therefore, the control for the evacuation run is relatively simple. If the control is performed by the other two normal mechanisms, it is necessary to perform a cooperative control for the two and it is necessary to have some parameter table and/or some exclusive function for specifying various control amounts only for the evacuation run. For example, if the variable intake system control valve causes the open-side-failure, the actual intake air amount increases and the number of engine revolutions increases. If the number of engine revolutions increases, a desired intake air amount is usually set to be small, but this is not an assumed condition, so one of the two normal mechanisms, that is, the opening control mechanism of the throttle valve may be driven too much to the close side, or another normal mechanism, that is, the variable valve mechanism may be driven too much to the close side, thereby possibly causing hunching (i.e. periodic vibration generated upon the idle rotation of the engine). Thus, it is necessary to prepare many parameter tables and exclusive functions corresponding to various aspects of the abnormality for the "evacuation run" in which an efficient run is extremely difficult or impossible due to the abnormality, and as a whole, it becomes extremely wasteful. On the contrary, realizing the control of the intake air amount by one mechanism, which is, for example, the opening control mechanism of the throttle valve or the variable valve mechanism, is far simple and easy, so that it can be certainly performed.

As described above, according to the first intake air amount control apparatus for the internal combustion engine of the present invention, the evacuation run can be performed more certainly in the internal combustion engine provided with a plurality of air-system variable mechanisms, such as the opening control mechanism of a throttle valve, the variable valve mechanism, and the intake characteristics change mechanism, for example.

In one aspect of the first intake air amount control apparatus of the present invention, the fail-safe device fixes (i) a control amount by the one of the opening control mechanism and the variable valve mechanism and (ii) a control amount by the intake characteristics change mechanism to be constant values in spite of an operation condition of the internal combustion engine, in case that the abnormal condition is detected in the one of the opening control mechanism and the variable valve mechanism.

According to this aspect, when the abnormality is detected in the one of the opening control mechanism of the throttle valve and the variable valve mechanism, not only the control amount by the one mechanism in which the abnormality is detected but also the control amount by the intake characteristics change mechanism, such as the above-described swirl control valve and the variable intake system control valve, are fixed to the constant values in spite of the operation condition. The "control amounts" associated with the present invention indicate the adjustment amount of the opening of the throttle valve in the opening control mechanism of the throttle valve, the adjustment amount of the opening/closing characteristics of the intake valve in the variable valve mechanism, and the adjustment amount of the predetermined parameter or parameters in the intake characteristics change mechanism. Then, the intake air amount is controlled by the other of the opening control mechanism and the variable valve mechanism, in which the abnormality is not detected, i.e. by the normal opening control mechanism or the normal variable valve mechanism, under the control of the fail-safe device, while the control amounts are fixed to constant values as described above. As a result, for example, the fuel injection is controlled in each cylinder according to the intake air amount controlled by the normal variable valve mechanism and the number of engine revolutions. Alternatively, for example, the fuel injection is controlled in each cylinder according to the intake air amount controlled by the normal opening control mechanisms of the throttle valve and the number of engine revolutions.

Consequently, even if the opening control mechanism of the throttle valve or the variable valve mechanism, which constitute the air-system variable mechanism, has a failure, the evacuation run sufficiently becomes possible by fixing various control amounts not only in the mechanism in which there is the abnormality but also in the intake characteristics change mechanism and by performing the simple intake-air-amount control by the mechanism in which there is not any abnormality.

Incidentally, in place of fixing both of the control amount by the mechanism in which the abnormality is detected and the control amount by the intake characteristics change mechanism to the constant values as described above, the present invention can be constructed such that the control for the two mechanisms is stopped or that the control amounts are fixed to some constant values (e.g. unknown values or default values) by stopping the control for the two mechanisms. Moreover, it may be constructed such that the control amounts change regularly or irregularly around some predetermined values or in a predetermined range (e.g. around unknown values or default values) by stopping the control. By constituting in this manner, it is possible to obtain a reasonable effect by shifting to the simple control for the one mechanism upon the occurrence of an abnormal condition, although this is inferior to the above-described aspect. The structure with such a "control stop" as described above is also included in the technical scope associated with the first intake air amount control apparatus of the present invention.

The above object of the present invention can be achieved by a second intake air amount control apparatus for an internal combustion engine provided with: an opening control mechanism for controlling an opening of a throttle valve disposed on an intake path of the internal combustion engine; a variable valve mechanism for varying opening/closing characteristics of at least one of an intake valve and an exhaust valve of the internal combustion engine; an intake characteristics change mechanism for changing intake characteristics of the internal combustion engine by controlling a parameter or parameters different from (i) the opening of the throttle valve and (ii) the opening/closing characteristics of the at least one of the intake valve and the exhaust valve; an intake amount control device for controlling an intake air amount supplied into a combustion chamber of the internal combustion engine by performing a cooperative control of the opening control mechanism, the variable valve mechanism and the intake characteristics change mechanism; an abnormality detection device for detecting an abnormal condition in the intake characteristics change mechanism; and a fail-safe device for controlling the opening control mechanism, the variable valve mechanism and the intake characteristics change mechanism in case that the abnormal condition is detected by the abnormality detection device in the intake characteristics change mechanism, so as to control the intake air amount by one of the opening control mechanism and the variable valve mechanism, in place of the cooperative control by the intake amount control device.

According to the second intake air amount control apparatus of the present invention, upon the operation thereof, the intake air amount supplied into the combustion chamber is controlled by that the cooperative control is controlled by the intake amount control device, as in the case of the first intake air amount control apparatus of the present invention described above.

In the case of the second intake air amount control apparatus of the present invention, for example, when there is any abnormal condition in the intake characteristics change mechanism, the abnormality is detected by the abnormality detection device. The abnormality which is detected specifically means, for example, the condition that the difference between (i) the actual experimental value (including both a directly or indirectly measured value and an estimated value) of the predetermined parameter associated with the intake characteristics change mechanism and (ii) the predetermined parameter of the intake characteristics change mechanism indicated by the intake amount control device is larger than a predetermined threshold value.

When such an abnormality is detected by the abnormality detection device in the intake characteristics change mechanism, the intake air amount is controlled by one of the opening control mechanism and the variable valve mechanism under the control of the fail-safe device, in place of the cooperative control by the intake amount control device for the above-described three mechanisms. As a result, for example, the fuel injection is controlled in each cylinder according to the intake air amount controlled by the normal opening control mechanisms of the throttle valve and the number of engine revolutions. Alternatively, for example, the fuel injection is controlled in each cylinder according to the intake air amount controlled by the normal variable valve mechanism and the number of engine revolutions.

Consequently, the evacuation run sufficiently becomes possible even upon the occurrence of an abnormal condition, while the present invention adopts such a structure that the internal combustion engine is operated under the cooperative control of actuators in various air-system variable mechanisms, which is suitable for the high fuel consumption and/or the high efficiency in the normal condition.

In one aspect of the second intake air amount control apparatus of the present invention, the fail-safe device fixes (i) a control amount by the intake characteristics change mechanism and (ii) a control amount by the other of the opening control mechanism and the variable valve mechanism to constant values in spite of an operation condition of the internal combustion engine, in case that the abnormal condition is detected in the intake characteristics change mechanism.

According to this aspect, when the abnormality is detected in the intake characteristics change mechanism, not only the control amount by the intake characteristics change mechanism in which the abnormality is detected but also the control amount by the other of the opening control mechanism and the variable valve mechanism as described above are fixed to be constant values in spite of the operation condition. Then, the intake air amount is controlled by the one of the opening control mechanism and the variable valve mechanism as described above under the control of the fail-safe device, while the control amounts are fixed to constant values as described above.

As a result, for example, the fuel injection is controlled in each cylinder according to the intake air amount controlled by the normal opening control mechanisms of the throttle valve and the number of engine revolutions. Alternatively, for example, the fuel injection is controlled in each cylinder according to the intake air amount controlled by the normal variable valve mechanism and the number of engine revolutions. As described above, even if the intake characteristics change mechanism has a failure, the evacuation run sufficiently becomes possible by shifting to the simple intake-air-amount control.

Incidentally, in place of fixing the control amounts to the constant values as described above, the present invention can be constructed such that the control is stopped or that the control amounts are fixed to some constant values by stopping the control. Moreover, it may be constructed such that the control amounts change regularly or irregularly around some predetermined values or in a predetermined range by stopping the control.

The above object of the present invention can be achieved by a third intake air amount control apparatus for an internal combustion engine provided with: an opening control mechanism for controlling an opening of a throttle valve disposed on an intake path of the internal combustion engine; a variable valve mechanism for varying the opening/closing characteristics of at least one of an intake valve and an exhaust valve of the internal combustion engine; an intake characteristics change mechanism for changing intake characteristics of the internal combustion engine by controlling a parameter or parameters different from (i) the opening of the throttle valve and (ii) the opening/closing characteristics of the at least one of the intake valve and the exhaust valve; an intake amount control device for controlling an intake air amount supplied into a combustion chamber of the internal combustion engine by performing a cooperative control of the opening control mechanism, the variable valve mechanism and the intake characteristics change mechanism; an abnormality detection device for detecting an abnormal condition in the opening control mechanism, the variable valve mechanism, and the intake characteristics change mechanism; and a fail-safe device for controlling the opening control mechanism, the variable valve mechanism, and the intake characteristics change mechanism, in case that the abnormal condition is detected by the abnormality detection device in one of the opening control mechanism, the variable valve mechanism, and the intake characteristics change mechanism, so as to control the intake air amount by another of the opening control mechanism, the variable valve mechanism, and the intake characteristics change mechanism, in place of the cooperative control by the intake amount control device.

According to the third intake air amount control apparatus of the present invention, upon the operation thereof, the intake air amount supplied into the combustion chamber is controlled by that the cooperative control is controlled by the intake amount control device, as in the case of the first intake air amount control apparatus of the present invention described above.

In the case of the third intake air amount control apparatus of the present invention, for example, when there is any abnormal condition in the opening change mechanism of the throttle valve, the abnormality is detected by the abnormality detection device. Alternatively, for example, when there is any abnormal condition in the variable valve mechanism, the abnormality is detected by the abnormality detection device. Moreover, for example, when there is any abnormal condition in the intake characteristics change mechanism, the abnormality is detected by the abnormality detection device.

When such an abnormality is detected by the abnormality detection device in one of the three mechanisms, the intake air amount is controlled by another of the opening control mechanism, the variable valve mechanism, and the intake characteristics change mechanism, in which the abnormality is not detected, i.e. by another of the normal opening control mechanism, variable valve mechanism, and intake characteristics change mechanism, in place of the cooperative control by the intake amount control device for the above-described three mechanisms. As a result, for example, the fuel injection is controlled in each cylinder according to the intake air amount controlled by the normal variable valve mechanism and the number of engine revolutions. Alternatively, for example, the fuel injection is controlled in each cylinder according to the intake air amount controlled by the normal opening control mechanisms of the throttle valve and the number of engine revolutions. Moreover, for example, the fuel injection is controlled in each cylinder according to the intake air amount controlled by the intake characteristics change mechanism and the number of engine revolutions.

Consequently, the evacuation run sufficiently becomes possible even upon the occurrence of an abnormal condition, while the present invention adopts a structure suitable for the high fuel consumption and/or the high efficiency in the normal condition.

In one aspect of the third intake air amount control apparatus of the present invention, the fail-safe device fixes (i) a control amount by the one of the opening control mechanism, the variable valve mechanism, and the intake characteristics change mechanism and (ii) a control amount by another of the three mechanisms, to constant values in spite of an operation condition of the internal combustion engine, in case that the abnormal condition is detected in the one of the three mechanisms.

According to this aspect, when the abnormality is detected in one of the three mechanisms (i.e., the opening control mechanism, the variable valve mechanism and the intake characteristics change mechanism), not only the control amount by the mechanism in which the abnormality is detected but also the control amount by the another of the three mechanisms in which the abnormality is not detected is fixed to the constant value in spite of the operation condition. Then, the intake air amount is controlled by the rest of the three mechanisms in which the abnormality is not detected, under the control of the fail-safe device, while the control amounts for the two mechanisms are fixed to the constant values as described above.

As a result, for example, the fuel injection is controlled in each cylinder according to the intake air amount controlled by the normal variable valve mechanism and the number of engine revolutions. Alternatively, for example, the fuel injection is controlled in each cylinder according to the intake air amount controlled by the normal opening control mechanisms of the throttle valve and the number of engine revolutions. Moreover, for example, the fuel injection is controlled in each cylinder according to the intake air amount controlled by the intake characteristics change mechanism and the number of engine revolutions. As described above, even if any one of the three mechanisms has a failure, the evacuation run sufficiently becomes possible by shifting to the simple intake-air-amount control.

Incidentally, in place of fixing the control amounts to the constant values as described above, the present invention can be constructed such that the control is stopped or that the control amounts are fixed to some constant values by stopping the control. Moreover, it may be constructed such that the control amounts change regularly or irregularly around some predetermined values or in a predetermined range by stopping the control.

In another aspect of the second intake air amount control apparatus of the present invention, the fail-safe device controls the opening control mechanism, the variable valve mechanism and the intake characteristics change mechanism, in case that the abnormal condition is detected in the intake characteristics change mechanism, so as to control the intake air amount by the opening control mechanism.

According to this aspect, when the abnormality is detected in the intake characteristics change mechanism, the intake air amount is controlled by the opening control mechanism under the control of the fail-safe device. As a result, the fuel injection is controlled in each cylinder according to the intake air amount controlled by the normal opening control mechanisms of the throttle valve and the number of engine revolutions.

In another aspect of the third intake air amount control apparatus of the present invention, the fail-safe device controls the opening control mechanism, the variable valve mechanism and the intake characteristics change mechanism, in case that the abnormal condition is detected in the variable valve mechanism or the intake characteristics change mechanism as the one of the three mechanisms, so as to control the intake air amount by the opening control mechanism as the another of the three mechanisms.

According to this aspect, when the abnormality is detected in the variable valve mechanism or the intake characteristics change mechanism, the intake air amount is controlled by the opening control mechanism of the throttle valve in which the abnormality is not detected, i.e. by the normal opening control mechanism, under the control of the fail-safe device. As a result, the fuel injection is controlled in each cylinder according to the intake air amount controlled by the normal opening control mechanisms of the throttle valve and the number of engine revolutions.

In another aspect of the first, second, or third intake air amount control apparatus of the present invention, the constant values are values which relatively reduce concentration of predetermined impurity or impurities in an exhaust gas generated by the internal combustion engine.

According to this aspect, the operating angle, which is the control amount of the variable valve mechanism, such as the operating angle change mechanism, is arbitrarily fixed. The swirl control valve and the variable intake system control valve are fixed to the close side. The opening timing of the intake valve is set to be the most retarded or delayed, and the closing timing of the exhaust valve is set to be the most advanced or the earliest. As a result, by minimizing or substantially minimizing a time length in which the intake valve and the exhaust valve are both open, i.e. a "valve overlap amount", it is possible to prevent a combustion exhaust gas from returning to the intake valve, which makes it possible to relatively reduce the concentration of predetermined impurity or impurities in the exhaust gas generated in the internal combustion engine. As described above, when two of the control amounts of the three mechanisms are fixed to constant values, the two of the control amounts are fixed to the constant values so as to reduce the concentration of predetermined impurities, such as NOx, in an exhaust gas, which can prevent the reduction of exhaust gas characteristics in the evacuation run to a greater or lesser extent.

In another aspect of the first, second, or third intake air amount control apparatus of the present invention, the constant values are values corresponding to the operating condition in a partial load area of the internal combustion engine.

According to this aspect, the operating angle, such as the operating angle change mechanism, is arbitrarily fixed. The swirl control valve and the variable intake system control valve are fixed to the close side. The opening timing of the intake valve is set to be the most retarded or delayed, and the closing timing of the exhaust valve is set to be the most advanced or the earliest. There is hardly any necessity to operate the engine at the high-speed rotations and on the high load in the "evacuation run" upon the occurrence of an abnormal condition. Thus, it is useful to reduce a possibility of an accidental fire and perform the evacuation run by operating the engine at the low number of engine revolutions and on the low load as in this aspect, in performing the evacuation run safely and certainly or preventing the reduction of the exhaust gas characteristics.

In another aspect of the first, second, or third intake air amount control apparatus of the present invention, the intake characteristics change mechanism includes at least one of (i) a swirl control valve for controlling the intake air amount by adjusting swirl in the combustion chamber, (ii) a variable intake system control valve for controlling the intake air amount by adjusting the intake path leading to the combustion chamber and (iii) a timing change mechanism for controlling the intake air amount by adjusting opening/closing timing (i.e., opening timing and/or closing timing) of at least one of the intake valve and the exhaust valve.

According to this aspect, upon the normal operation, the intake air amount is controlled by that the predetermined parameter is adjusted by the intake characteristics change mechanism, such as the swirl control valve, the variable intake system control valve, and the timing change mechanism, through the cooperation with the opening control mechanism of a throttle valve and the variable valve mechanism. Particularly, as the variable intake system control valve, there are a valve for varying the length of the effect intake tube, a valve for varying the capacity of the serge tank, a valve for varying the capacity or the cross sectional area of the intake port or the intake tube, or the like. When the abnormality is detected in such an intake characteristics change mechanism, the control amount of the intake characteristics change mechanism is fixed to a constant value. Alternatively, when the abnormality is detected in the variable valve mechanism or the opening control mechanism, the control amount of the intake characteristics change mechanism is fixed to a constant value.

The above object of the present invention can be achieved by an intake air amount control method for an internal combustion engine of controlling an intake air amount of the internal combustion engine by performing a cooperative control of (I) an opening control mechanism for controlling an opening of a throttle valve disposed on an intake path of the internal combustion engine, (II) a variable valve mechanism for varying the opening/closing characteristics of at least one of an intake valve and an exhaust valve of the internal combustion engine and (III) an intake characteristics change mechanism for changing intake characteristics of the internal combustion engine by controlling a parameter or parameters different from (i) the opening of the throttle valve and (ii) the opening/closing characteristics of at least one of the intake valve and the exhaust valve, wherein the method controls the intake air amount, in case that there is any abnormality in one of the opening control mechanism, the variable valve mechanism, and the intake characteristics change mechanism, only by another of the opening control mechanism, the variable valve mechanism, and the intake characteristics change mechanism.

According to the intake air amount control method of the present invention, the evacuation run sufficiently becomes possible even upon the occurrence of an abnormal condition, while the present invention adopts the intake air amount control method by the cooperative control in the normal condition, as in the case of the above-described first, second or third intake air amount control apparatus of the present invention.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENT

Figure 1:
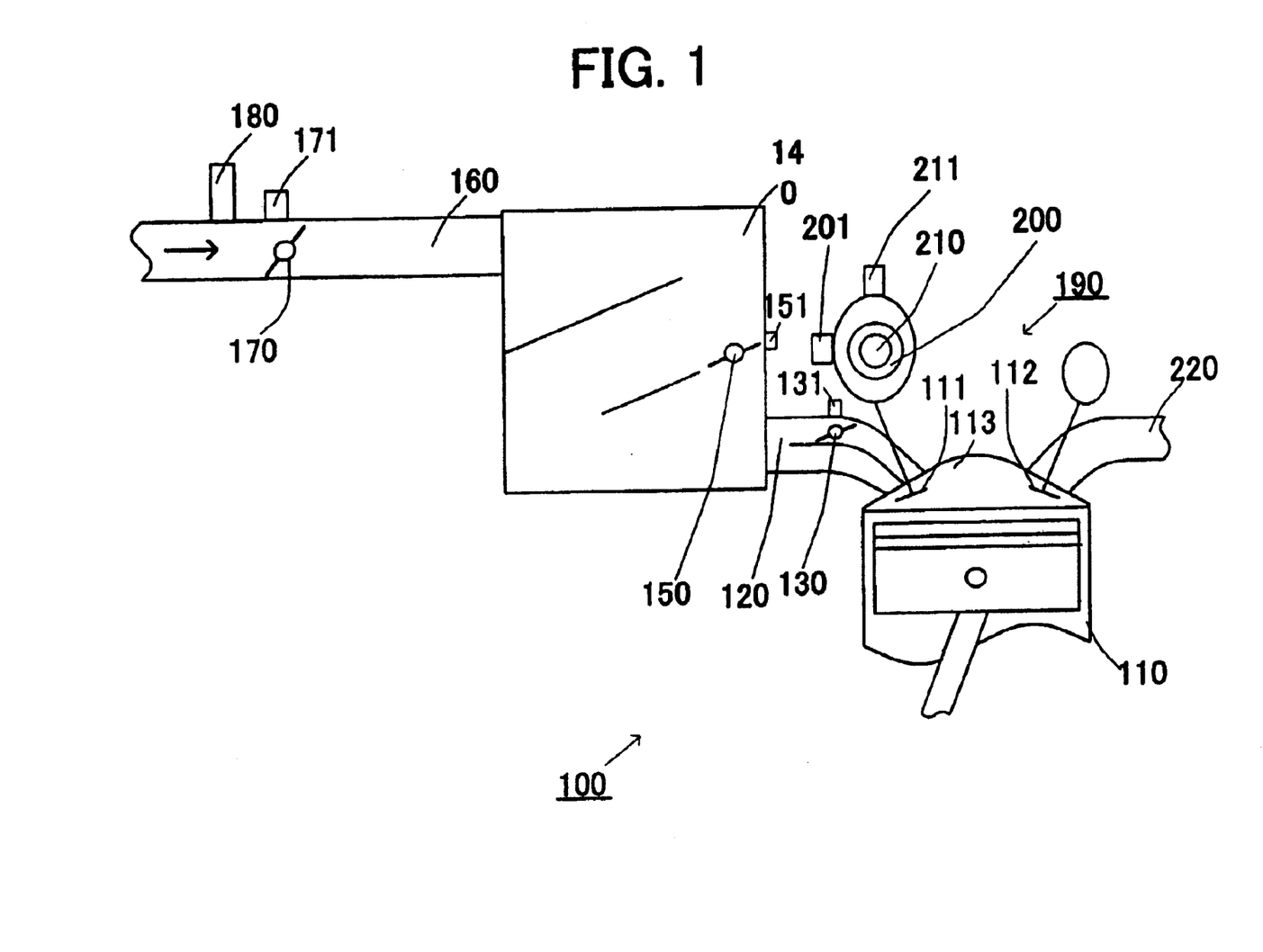
FIG. 1 is a cross sectional view schematically showing the system outline of an internal combustion engine of an embodiment of the present invention.

The specific embodiment of an intake air amount control apparatus for an internal combustion engine of the present invention will be explained with reference to the drawings. FIG. 1 schematically shows the system outline of the internal combustion engine to which the present invention is applied. Incidentally, in the embodiment, an internal combustion engine 100 is an internal combustion engine mounted on a vehicle, such as an automobile, and is provided with a water-cooled gasoline engine of the four-stroke-cycles type which is fueled by gasoline.

In FIG. 1, the intake system of the internal combustion engine 100 is constructed such that the air inhaled from a not-illustrated air duct for taking in the outside air flows, through an airflow meter 180 and an electronic control throttle valve 170 with a throttle position sensor 171, from an intake tube 160 to a serge tank 140, and further flows through a swirl control valve 130 in an intake port 120 to a combustion chamber 113 in a cylinder 110. The intake port 120 is provided with an intake valve 111 for opening and closing the intake port 120.

The serge tank 140 has a function of preventing an intake pulse. It is possible to obtain a high volume efficiency in a broad range of the engine revolutions by varying the capacity of the serge tank 140. A variable intake system control valve 150 divides the serge tank 140. The opening and closing of the variable intake system control valve 150 with a variable intake system control valve opening sensor 151 realizes a variable intake system (i.e., an Acoustic Control Induction System (ACIS)) capable of varying the length of the intake tube 160 which effectively works (i.e. an effective intake tube length). Moreover, the swirl control valve 130 with a swirl control valve opening sensor 131 generates a swirl flow, which causes the atomization of fuel, the increase of a combustion rate, or the promotion of a lean combustion, thereby improving the fuel consumption in the evacuation run.

On the other hand, the exhaust system of the internal combustion engine 100 is constructed such that an exhaust gas is exhausted from the combustion chamber 113 through an exhaust port 220, an exhaust tube, an exhaust gas purification catalyst, and a muffler, which are not illustrated, to the air. The exhaust port 220 is provided with an exhaust valve 112 for opening and closing the exhaust port 220.

The intake valve 111 is provided with an operating angle change mechanism 200 and a timing change mechanism (or VVT) 210. The exhaust valve 112 may also be provided with these mechanisms in the similar manner.

The operating angle change mechanism 200 is provided for each variable valve mechanism 190 and changes the lift amount and the lift period (i.e. the operating angle) of the intake -valve 111. As the operating angle change mechanism 200, it is possible to exemplify a mechanism of continuously changing the lift amount and the lift period (i.e. the operating angle) of the intake valve 111 by using a rotating cam, for example. An operating angle detection sensor 201 detects the operating angle of the intake valve 111. The timing change mechanism 210 is provided for each variable valve mechanism 190 and changes the opening and closing timing of the intake valve 111. As the timing change mechanism 210, it is possible to exemplify a mechanism of continuously changing the rotational phase of a not-illustrated intake camshaft with respect to the rotation of a not-illustrated crankshaft, for example. A phase angle difference detection sensor 211 detects the rotational phase angle difference of the not-illustrated intake camshaft with respect to the rotation of the not-illustrated crankshaft.

Figure 2:
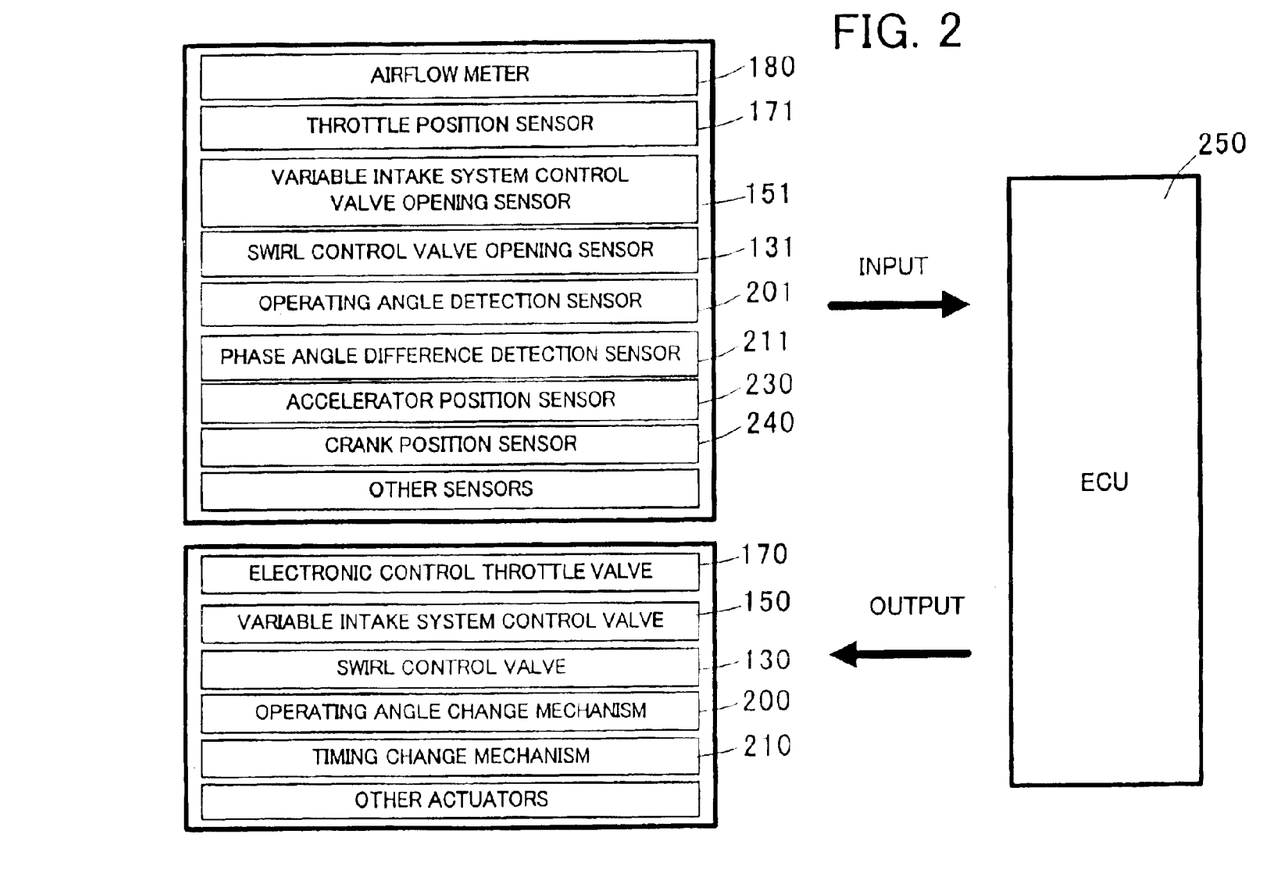
FIG. 2 is a conceptual diagram showing an Electronic Control Unit (ECU) for controlling the operating condition, various sensors for inputting various detection signals and parameters to this ECU, a driving mechanism and various valves controlled by the ECU or the like in the embodiment.

Next, an Electronic Control Unit (ECU) 250 for controlling the operating condition of the internal combustion engine 100 will be described with reference to FIG. 2. FIG. 2 shows (i) the ECU 250, (ii) various sensors for inputting various detection signals and parameters to this ECU 250, and (iii) various driving mechanisms, various valves and the like controlled by the ECU 250.

In FIG. 2, the ECU 250 is an arithmetic-logic circuit provided with: a Control Processing Unit (CPU); a Read Only Memory (ROM); a Random Access Memory (RAM); a backup RAM; and the like. This ECU 250 generates a plurality of types of various control signals with the output signals (i.e. electrical signals) of various sensors as the input parameters for a preset program. The various sensors are the airflow meter 180, the throttle position sensor 171, the variable intake system control valve opening sensor 151, the swirl control valve opening sensor 131, the operating angle detection sensor 201, the phase angle difference detection sensor 211, an accelerator position sensor 230, a crank position sensor 240 mounted on the internal combustion engine 100, and not-illustrated other sensors, such as a water temperature sensor or the like. The ECU 250 controls, with the various control signals, the opening of the swirl control valve 130, the opening of the variable intake system control valve 150, the opening of the electronic control throttle valve 170, the lift amount and the lift period (i.e. the operating angle) of the operating angle change mechanism 200, the opening and closing timing of the timing change mechanism 210, and other actuators.

Figure 3:
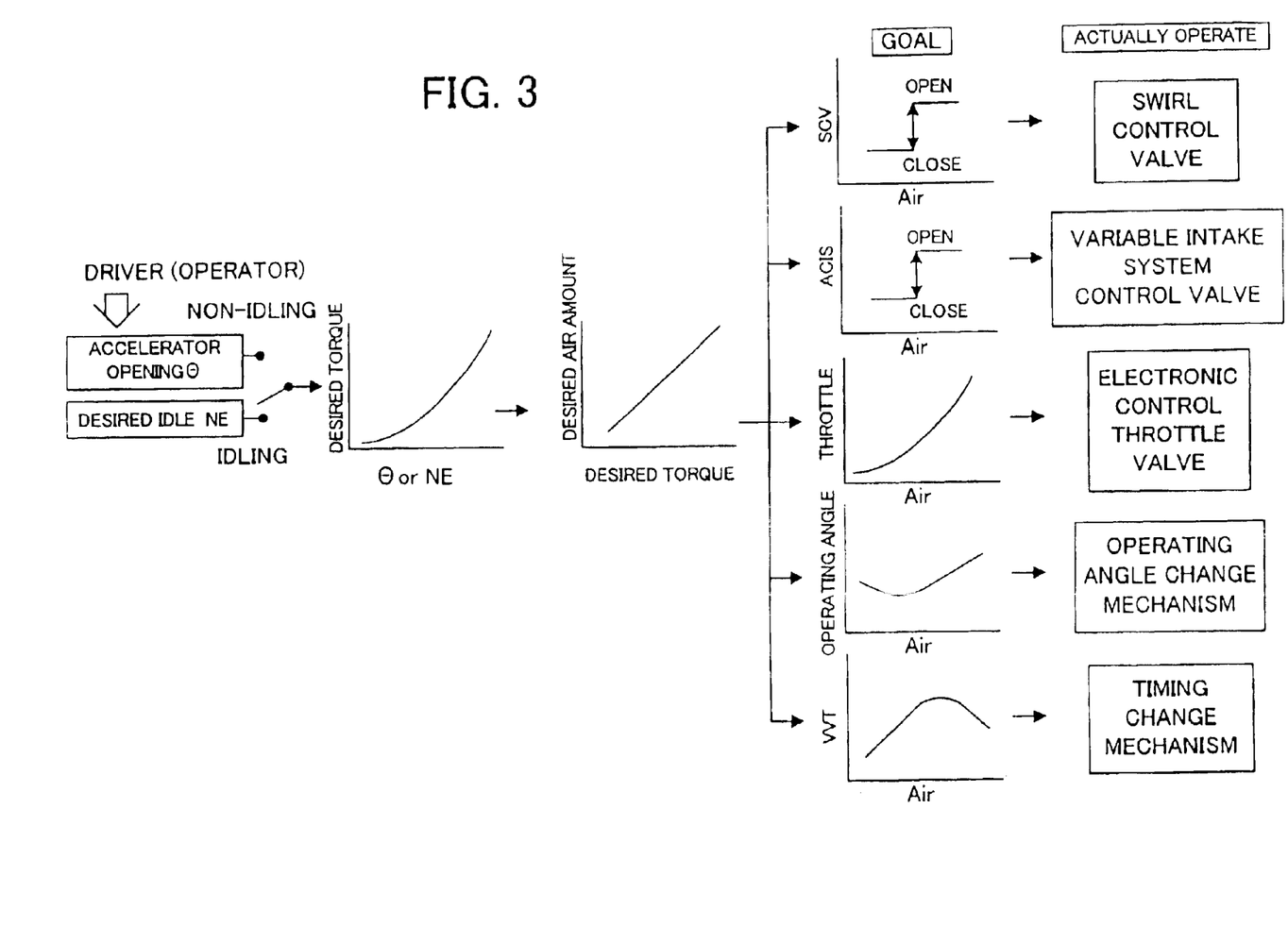
FIG. 3 is a conceptual diagram showing the outline of the ECU of the internal combustion engine controlling an intake air amount in the embodiment.

Next, the outline of how the ECU 250 controls the various actuators to control the intake air mount of the internal combustion engine 100 will be described with reference to FIG. 3. FIG. 3 shows the outline of the ECU 250 cooperatively controlling the various actuators to obtain the desired torque.

Specifically, the ECU 250 cooperatively controls the swirl control valve 130, the variable intake system control valve 150, the electronic control throttle valve 170, the operating angle change mechanism 200, and the timing change mechanism 210 and performs such a control that the intake air amount of the internal combustion engine 100 is converged to the desired intake air amount (hereinafter referred to as the "desired-intake-air-amount control"), upon the normal operation.

In the desired-intake-air-amount control, the ECU 250 firstly judges or determines whether or not the internal combustion engine 100 is in an idle state. For example, if the accelerator opening is in a fully close condition and if a vehicle speed is zero, the ECU 250 judges that the internal combustion engine 100 is in the idle state. The desired-intake-air-amount control has two types of controls: (1) the control upon non-idling and (2) the control upon idling. They will be explained hereinafter.

(1) Control Upon Non-Idling:

In the desired-intake-air-amount control, the ECU 250 firstly calculates the number of engine revolutions according to the time intervals at which the crank position sensor 240 outputs a pulse signal, and reads the output signal value (i.e. the accelerator opening) of the accelerator position sensor 230.

Then, the ECU 250 determines the desired torque of the internal combustion engine 100 with the number of engine revolutions and the accelerator opening as parameters. Such determination can be quickly performed by using a table or a predetermined function, which defines a relationship between the accelerator opening and the desired torque and which is set and stored in advance in a built-in memory or the like of the ECU 250.

Then, the ECU 250 determines an intake air amount required for the consistency of the actual torque of the internal combustion engine 100 with the desired torque (i.e. the desired intake air amount). At that time, the desired intake air amount is set to increase as the accelerator opening becomes larger and the number of engine revolutions increases.

Then, with the desired intake air amount as a parameter, the ECU 250 determines the opening of the swirl control valve 130, the opening of the variable intake system control valve 150, the opening of the electronic control throttle valve 170, the operating angle of the intake valve 111, and the rotational phase angle difference of the intake camshaft with respect to the rotation of the crankshaft, i.e. the opening and closing timing of the intake valve 111.

Then, the ECU 250 generates a plurality of types of various control signals with the above-described determined values as the input parameters for a preset program. The ECU 250 actually operates, with these various control signals, the opening of the swirl control valve 130, the opening of the variable intake system control valve 150, the opening of the electronic control throttle valve 170, the operating angle of the intake valve 111, and the rotational phase angle difference of the intake camshaft with respect to the rotation of the crankshaft, i.e. the opening and closing timing of the intake valve 111.

(2) Control Upon Idling:

In typical idle control, the ECU 250 firstly determines the desired number of engine revolutions (NE) upon idling from the operating conditions of auxiliaries or the like. Then, it controls the intake air amount with this determined desired number of engine revolutions (NE) as a parameter.

Specifically in the embodiment, in case that there is an abnormality in the air-system variable mechanism provided with: the variable valve mechanism; the throttle mechanism; the variable intake system (AICS); or the like, the ECU 250, which constitutes one example of the control apparatus for the internal combustion engine 100, the fail-safe processing is performed which varies according to the aspect of the abnormality.

Figure 4:
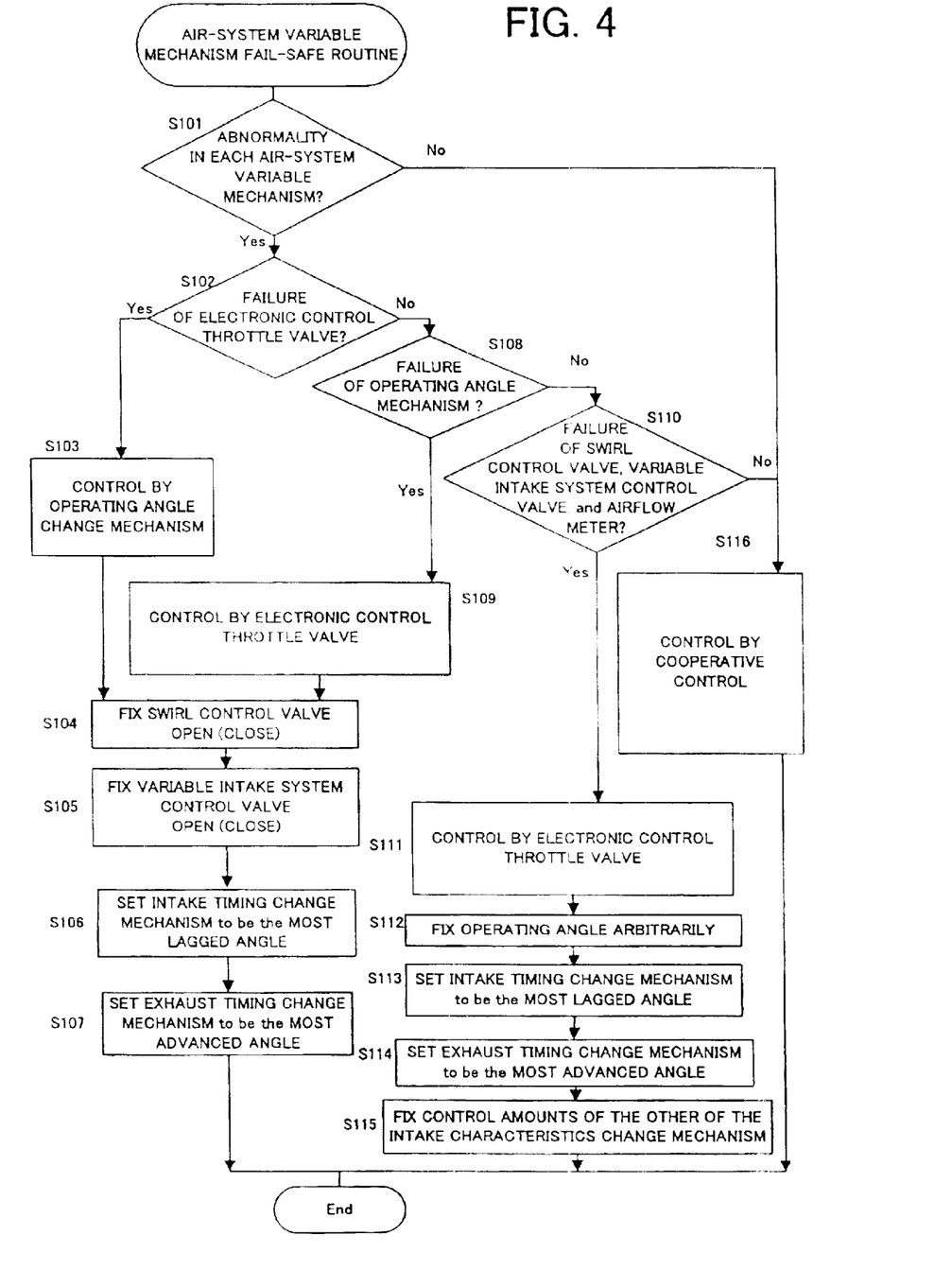
FIG. 4 is a flowchart showing a fail-safe routine in an air-system valuable mechanism in the embodiment of the present invention.

The fail-safe processing controlled by the ECU 250 in the embodiment will be explained hereinafter with reference to FIG. 4. FIG. 4 shows a fail-safe routine in the air-system valuable mechanism. This fail-safe routine in the air-system valuable mechanism is a routine stored in advance in the ROM of the ECU 250 and is performed mainly by the ECU 250 regularly or irregularly during the operation of the internal combustion engine 100.

In the embodiment, as explained later, one example of the "fail-safe device" and the "intake amount control device" of the present invention is provided with the common ECU 250. On the other hand, one example of the "abnormality detection device" of the present invention is provided with the ECU 250 and the various sensors associated with the air-system variable mechanism shown in FIG. 2.

In FIG. 4, it is firstly judged by the ECU 250 whether or not there is any abnormality in the various air-system variable mechanisms provided with: the opening control mechanism of a throttle valve; the variable valve mechanism; the intake characteristics change mechanism; and the like (step S101). Such a judgment is performed on the ECU 250 on the basis of the detection signals of the operating angle detection sensor 201 and the like, which have been explained with reference to FIG. 2, for example. Specifically, the difference between the actual control amounts of the various air-system variable mechanisms and the control amounts of the various air-system variable mechanisms indicated by the ECU 250 is calculated by the ECU 250, and whether or not the error is larger than a set fail-detection range is judged by the ECU 250, for example. If the error is larger than the set fail-detection range, i.e. if any abnormality is detected (the step S101: Yes), a driver is informed of the occurrence of the abnormality by an alarm apparatus, such as a display apparatus and acoustic equipment, mounted on a dash board or the like. Moreover, it is also judged whether or not the electronic control throttle valve 170 has a failure (step S102). If the electronic control throttle valve 170 has a failure (the step S102: Yes), the driver is informed of the occurrence of the abnormality by the alarm apparatus, such as a display apparatus and acoustic equipment, and the intake air amount is controlled only by the operating angle change mechanism 200 (step S103). The driver who is informed of the occurrence of the abnormality usually performs the evacuation run to a repair shop, a maintenance shop, or the like. The intake air amount in the evacuation run in this case is not controlled by the cooperative control upon the occurrence of any normal condition, but is controlled only by the operating angle change mechanism 200.

Then, the swirl control valve 130 is fixed to the open side or close side. For example, when the swirl control valve 130 is fixed to the close side, a swirl flow is generated, which causes the atomization of fuel, the increase of a combustion rate, or the acceleration of the lean combustion, thereby improving the fuel consumption in the evacuation run. The opening of the swirl control valve 130 may be fixed to an opening corresponding to a partial load operation area (step S104). Moreover, the variable intake system control valve 150 is fixed to the open side or close side. The opening of the variable intake system control valve 150 may be fixed to an opening corresponding to the partial load operation area. For example, the effective intake tube length is set to be long and a pulse effect is increased under the control of the fail-safe device, and the capacity of the serge tank 140 is fixed to be small or the cross sectional area of the intake tube 150 or the intake port 120 is fixed to be small under the control of the fail-safe device, thereby allowing the increases of an intake flow rate and the inertia effect. Alternatively, by using the resonance supercharged effect in a low-speed operation under the control of the fail-safe device, it is possible to increase the volume efficiency at the low revolutions (step S105). Moreover, the timing change mechanism 210 of the intake valve 111 is set to be the most lagged angle, i.e. the opening timing of the intake valve 111 is set to be the most retarded or delayed (step S106), and further more, the timing change mechanism 210 of the exhaust valve 112 is set to be the most advanced angle, i.e. the closing timing of the exhaust valve 112 is set to be the most advanced or the earliest (step S107). Incidentally, the processing in the step S106 and the step S107 minimizes a time length in which the exhaust valve 112 and the intake valve 111 are both open, i.e. a valve overlap amount, which prevents a combustion exhaust gas from returning to the intake valve 111. Therefore, there is hardly or not any possibility of an accidental fire in the low number of engine revolutions or the low load of the engine. Namely, in this case, the control for the evacuation run upon the occurrence of any abnormal condition is performed.

On the other hand, if it is judged that the electronic control throttle valve 170 is normal (the step S102: No) as a result of the judgment in the step S102, it is further judged whether or not the operating angle change mechanism 200 has a failure (step S108). If the operating angle change mechanism 200 has a failure (the step S108: Yes), the driver is informed of the occurrence of the abnormality by the alarm apparatus, such as a display apparatus and acoustic equipment, mounted on a dashboard or the like, and the intake air amount is controlled only by the electronic control throttle valve 170 corresponding to the accelerator opening (step S109). Namely, the intake air amount in the evacuation run in this case is not controlled by the cooperative control upon the occurrence of any normal condition, but is controlled only by the electronic control throttle valve 170.

Then, the above-described processing from the step S104 to the step S107 is performed. Namely, in this case, the control for the evacuation run upon the occurrence of any abnormal condition is performed.

On the other hand, if it is judged that the operating angle change mechanism 200 is normal (the step S108: No) as a result of the judgment in the step S108, it is further judged whether or not the intake characteristics change mechanism, such as the swirl control valve 130, the variable intake system control valve 150, and the airflow meter 180, has a failure (step S110). Specifically, the difference between the actual opening of the swirl control valve 130 and the opening of the swirl control valve 130 indicated by the ECU 250 is calculated by the ECU 250, and whether or not the error is larger than a set fail-detection range is judged by the ECU 250. The same judgment is also performed for the variable intake system control valve 150. If the difference between the actual opening of the swirl control valve 130 and the opening of the swirl control valve 130 indicated by the ECU 250 is larger than the set fail-detection range, it is judged to have a failure, and also a driver is informed of the occurrence of the abnormality by an alarm apparatus, such as a display apparatus and acoustic equipment, mounted on a dash board or the like (the step S110: Yes). The intake air amount is controlled only by the electronic control throttle valve 170 corresponding to the accelerator opening (step S111). Namely, the intake air amount in the evacuation run in this case is not controlled by the cooperative control upon the occurrence of any normal condition, but is controlled only by the electronic control throttle valve 170.

Then, the operating angle is arbitrarily fixed (step S112). Incidentally, fixing the operating angle arbitrarily thereby to control the intake air amount only by the electronic control throttle valve 170 corresponding to the accelerator opening, as in the step S111 and the step S112, is more useful in terms of the moderate response of the intake air amount and the avoidance in showing a vehicle shock, as compared with the case where the opening of the electronic control throttle valve 170 is fixed thereby to control the intake air amount only by the operating angle change mechanism 200. In addition, it is easy to control the intake air amount when it is small, and it is also useful in terms of easy idling control.

Then, the timing change mechanism 210 of the intake valve 111 is set to be the most lagged angle, i.e. the opening timing of the intake valve 111 is set to be the most retarded or delayed (step S113), and further more, the timing change mechanism 210 of the exhaust valve 112 is set to be the most advanced angle, i.e. the closing timing of the exhaust valve 112 is set to be the most advanced or the earliest (step S114). Incidentally, the processing in the step S113 and the step S114 minimizes a time length in which the exhaust valve 112 and the intake valve 111 are both open, i.e. the valve overlap amount, which prevents a combustion exhaust gas from returning to the intake valve 111. Therefore, there is hardly or not any possibility of an accidental fire in the low number of engine revolutions or the low load of the engine.

Then, the control amounts of the other (or rest) of the intake characteristics change mechanism are fixed (step S115). As described above, the control for the evacuation run upon the occurrence of any abnormal condition is performed.

On the other hand, if it is judged that each of the various air-system variable mechanisms is normal (the step S101: No) as a result of the judgment in the step S101, or if it is judged that the intake characteristics change mechanism, such as the swirl control valve 130, the variable intake system control valve 150, and the airflow meter 180, is normal (step S110: No) as a result of the judgment in the step S110, the intake air amount is controlled in the ECU 250 by the cooperating control between (i) the electronic control throttle valve 170 corresponding to the accelerator opening and (ii) the operating angle change mechanism 200 (step S116). Namely, in this case, not the control for the evacuation run but the control for the normal run is performed.

As described above, by the ECU 250 performing the fail-safe routine in the air-system valuable mechanism as shown in FIG. 4, it is possible to continue the operation of the internal combustion engine 100 even in case that there is an abnormality in the air-system variable mechanism, and a vehicle equipped with the internal combustion engine 100 can perform the evacuation run. Moreover, a driver is informed of the occurrence of the abnormality or failure, so that the evacuation run can be performed as it is, and it is possible to effectively avoid the fact that an unreasonable run, such as a high-speed run, is performed upon the occurrence of any abnormal condition. Furthermore, the ECU 250 becomes able to minimize the drivability of the internal combustion engine 100 and the deterioration of the exhaust emission in the evacuation run.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-088073 filed on Mar. 27, 2003 including the specification, claims, drawings and summary is incorporated herein by reference in its entirety.

What is claimed is:

1. An intake air amount control apparatus for an internal combustion engine comprising:

an opening control mechanism for controlling an opening of a throttle valve disposed on an intake path of the internal combustion engine;

a variable valve mechanism for varying opening/closing characteristics of at least one of an intake valve and an exhaust valve of the internal combustion engine;

an intake characteristics change mechanism for changing intake characteristics of the internal combustion engine by controlling a parameter or parameters different from (i) the opening of the throttle valve and (ii) the opening/closing characteristics of said at least one of the intake valve and the exhaust valve;

an intake amount control device for controlling an intake air amount supplied into a combustion chamber of the internal combustion engine by performing a cooperative control of said opening control mechanism, said variable valve mechanism and said intake characteristics change mechanism;

an abnormality detection device for detecting an abnormal condition in said opening control mechanism and said variable valve mechanism; and a fail-safe device for controlling said opening control mechanism, said variable valve mechanism and said intake characteristics change mechanism, in case that the abnormal condition is detected by said abnormality detection device in one of said opening control mechanism and said variable valve mechanism, so as to control the intake air amount by the other of said opening control mechanism and said variable valve mechanism, in place of the cooperative control by said intake amount control device.

2. The intake air amount control apparatus according to claim 1, wherein said fail-safe device fixes (i) a control amount by the one of said opening control mechanism and said variable valve mechanism and (ii) a control amount by said intake characteristics change mechanism, to constant values in spite of an operation condition of the internal combustion engine, in case that the abnormal condition is detected in the one of said opening control mechanism and said variable valve mechanism.

3. An intake air amount control apparatus for an internal combustion engine comprising:

an opening control mechanism for controlling an opening of a throttle valve disposed on an intake path of the internal combustion engine;

a variable valve mechanism for varying opening/closing characteristics of at least one of an intake valve and an exhaust valve of the internal combustion engine;

an intake characteristics change mechanism for changing intake characteristics of the internal combustion engine by controlling a parameter or parameters different from (i) the opening of the throttle valve and (ii) the opening/closing characteristics of said at least one of the intake valve and the exhaust valve;

an intake amount control device for controlling an intake air amount supplied into a combustion chamber of the internal combustion engine by performing a cooperative control of said opening control mechanism, said variable valve mechanism and said intake characteristics change mechanism;

an abnormality detection device for detecting an abnormal condition in said intake characteristics change mechanism; and a fail-safe device for controlling said opening control mechanism, said variable valve mechanism and said intake characteristics change mechanism, in case that the abnormal condition is detected by said abnormality detection device in said intake characteristics change mechanism, so as to control the intake air amount by one of said opening control mechanism and said variable valve mechanism, in place of the cooperative control by said intake amount control device.

4. The intake air amount control apparatus according to claim 3, wherein said fail-safe device fixes (i) a control amount by said intake characteristics change mechanism and (ii) a control amount by the other of said opening control mechanism and said variable valve mechanism, to constant values in spite of an operation condition of the internal combustion engine, in case that the abnormal condition is detected in said intake characteristics change mechanism.

5. An intake air amount control apparatus for an internal combustion engine comprising:

an opening control mechanism for controlling an opening of a throttle valve disposed on an intake path of the internal combustion engine;

a variable valve mechanism for varying opening/closing characteristics of at least one of an intake valve and an exhaust valve of the internal combustion engine;

an intake characteristics change mechanism for changing intake characteristics of the internal combustion engine by controlling a parameter or parameters different from (i) the opening of the throttle valve and (ii) the opening/closing characteristics of said at least one of the intake valve and the exhaust valve;

an intake amount control device for controlling an intake air amount supplied into a combustion chamber of the internal combustion engine by performing a cooperative control of said opening control mechanism, said variable valve mechanism and said intake characteristics change mechanism;

an abnormality detection device for detecting an abnormal condition in said opening control mechanism, said variable valve mechanism and said intake characteristics change mechanism; and a fail-safe device for controlling said opening control mechanism, said variable valve mechanism and said intake characteristics change mechanism, in case that the abnormal condition is detected by said abnormality detection device in one of said opening control mechanism, said variable valve mechanism and said intake characteristics change mechanism, so as to control the intake air amount by another of said opening control mechanism, said variable valve mechanism and said intake characteristics change mechanism, in place of the cooperative control by said intake amount control device.

6. The intake air amount control apparatus according to claim 5, wherein said fail-safe device fixes (i) a control amount by the one of said opening control mechanism, said variable valve mechanism and said intake characteristics change mechanism and (ii) a control amount by another of said opening control mechanism, said variable valve mechanism and said intake characteristics change mechanism, to constant values in spite of an operation condition of the internal combustion engine, in case that the abnormal condition is detected in the one of said opening control mechanism, said variable valve mechanism and said intake characteristics change mechanism.

7. The intake air amount control apparatus according to claim 3, wherein said fail-safe device controls said opening control mechanism, said variable valve mechanism and said intake characteristics change mechanism, in case that the abnormal condition is detected in said intake characteristics change mechanism, so as to control the intake air amount by said opening control mechanism.

8. The intake air amount control apparatus according to claim 5, wherein said fail-safe device controls said opening control mechanism, said variable valve mechanism and said intake characteristics change mechanism in case that the abnormal condition is detected in said variable valve mechanism or said intake characteristics change mechanism as the one of said opening control mechanism, said variable valve mechanism and said intake characteristics change mechanism, so as to control the intake air amount by said opening control mechanism as the another of said opening control mechanism, said variable valve mechanism and said intake characteristics change mechanism.

9. The intake air amount control apparatus according to claim 2, wherein the constant values are values which relatively reduce concentration of predetermined impurity or impurities in an exhaust gas generated by the internal combustion engine.

10. The intake air amount control apparatus according to claim 4, wherein the constant values are values which relatively reduce concentration of predetermined impurity or impurities in an exhaust gas generated by the internal combustion engine.

11. The intake air amount control apparatus according to claim 6, wherein the constant values are values which relatively reduce concentration of predetermined impurity or impurities in an exhaust gas generated by the internal combustion engine.

12. The intake air amount control apparatus according to claim 2, wherein the constant values are values corresponding to the operating condition in a partial load area of the internal combustion engine.

13. The intake air amount control apparatus according to claim 4, wherein the constant values are values corresponding to the operating condition in a partial load area of the internal combustion engine.

14. The intake air amount control apparatus according to claim 6, wherein the constant values are values corresponding to the operating condition in a partial load area of the internal combustion engine.

15. The intake air amount control apparatus according to claim 1, wherein said intake characteristics change mechanism includes at least one of (i) a swirl control valve for controlling the intake air amount by adjusting swirl in the combustion chamber, (ii) a variable intake system control valve for controlling the intake air amount by adjusting an intake path leading to the combustion chamber and (iii) a timing change mechanism for controlling the intake air amount by adjusting opening/closing timing of at least one of the intake valve and the exhaust valve.

16. The intake air amount control apparatus according to claim 3, wherein said intake characteristics change mechanism includes at least one of (i) a swirl control valve for controlling the intake air amount by adjusting swirl in the combustion chamber, (ii) a variable intake system control valve for controlling the intake air amount by adjusting an intake path leading to the combustion chamber and (iii) a timing change mechanism for controlling the intake air amount by adjusting opening/closing timing of at least one of the intake valve and the exhaust valve.

17. The intake air amount control apparatus according to claim 5, wherein said intake characteristics change mechanism includes at least one of (i) a swirl control valve for controlling the intake air amount by adjusting swirl in the combustion chamber, (ii) a variable intake system control valve for controlling the intake air amount by adjusting an intake path leading to the combustion chamber and (iii) a timing change mechanism for controlling the intake air amount by adjusting opening/closing timing of at least one of the intake valve and the exhaust valve.

18. An intake air amount control method for an internal combustion engine of controlling an intake air amount of the internal combustion engine by performing a cooperative control of (I) an opening control mechanism for controlling an opening of a throttle valve disposed on an intake path of the internal combustion engine, (II) a variable valve mechanism for varying opening/closing characteristics of at least one of an intake valve and an exhaust valve of the internal combustion engine and (III) an intake characteristics change mechanism for changing intake characteristics of the internal combustion engine by controlling a parameter or parameters different from (i) the opening of the throttle valve and (ii) the opening/closing characteristics of at least one of the intake valve and the exhaust valve, wherein said method controls the intake air amount, in case that there is any abnormality in one of said opening control mechanism, said variable valve mechanism and said intake characteristics change mechanism, only by another of said opening control mechanism, said variable valve mechanism and said intake characteristics change mechanism.

* * * * *